United States Patent [19]

Urabe et al.

[11] Patent Number: 4,612,903

[45] Date of Patent: Sep. 23, 1986

[54] INDUCTION SYSTEM FOR INTERNAL COMBUSTION ENGINE HAVING MULTIPLE INLET VALVES

[75] Inventors: Suehiro Urabe, Yokohoma; Yoshio Iwasa, Nagareyama, both of Japan

[73] Assignee: Nissan Motor Co., Ltd., Japan

[21] Appl. No.: 721,952

[22] Filed: Apr. 11, 1985

[30] Foreign Application Priority Data

Apr. 24, 1984 [JP] Japan .................................. 59-81049

[51] Int. Cl.⁴ ............................................. F02B 15/00
[52] U.S. Cl. ................................. 123/432; 123/52 M; 123/188 M
[58] Field of Search ..................... 123/432, 308, 52 M, 123/188 M

[56] References Cited

U.S. PATENT DOCUMENTS

| | | | |
|---|---|---|---|
| 4,216,748 | 8/1980 | Ichida | 123/432 |
| 4,271,802 | 6/1981 | Hori et al. | 123/432 |
| 4,300,504 | 11/1981 | Tezuka | 123/432 |
| 4,304,211 | 12/1981 | Tezuka et al. | 123/432 |
| 4,438,743 | 3/1984 | Namba et al. | 123/308 |
| 4,469,067 | 9/1984 | Futakuchi | 123/308 |
| 4,470,391 | 9/1984 | Ishida | 123/308 |
| 4,528,958 | 7/1985 | Yoshida et al. | 123/432 |

FOREIGN PATENT DOCUMENTS 57-110765  7/1982  Japan .
4731724  8/1982  Japan .

Primary Examiner—E. Rollins Cross
Attorney, Agent, or Firm—Lane and Aitken

[57] ABSTRACT

Each combustion chamber of the engine is communicated with (a) first and second induction passages which are dimensioned to produce an optimal ramming effect during high speed and (b) a third passage which provides good ramming during low engine speed operation. The first and second induction passages are provided with flow control valves which can be opened simultaneously or in a step-wise manner as the engine speed moves from a low speed range into a high speed one. The third passage is arranged to merge with the first so that during idling and the like, the flow of air therefrom enters the combustion chamber in a manner which produces a strong swirl and promotes good atomization of the fuel injected into the first passage by a fuel injector.

9 Claims, 7 Drawing Figures

INDUCTION SYSTEM FOR INTERNAL COMBUSTION ENGINE HAVING MULTIPLE INLET VALVES

BACKGROUND OF THE INVENTION

1. Field of the Invention

The present invention relates generally to automotive internal combustion engine and more specifically to an induction system for an internal combustion engine wherein each combustion chamber is communicated with the induction system through multiple inlet valves.

2. Description of the Prior Art

Japanese Patent Application First Provisional Publication Sho 47-31724 discloses an induction arrangement wherein each combustion chamber of the engine is provided with first and second inlet valves. The first of the valves is arranged to open well ahead of TDC of the exhaust stroke so as to provide a relatively large valve overlap with respect to the timing of a single exhaust valve. The cylinder head in which the valves are disposed is formed with a first inlet port which leads to the first valve. This inlet or induction port is provided with a butterfly type valve which is arranged to cut off communication between the induction manifold attached to the cylinder head and the first inlet valve when the engine is operating at low engine speeds. The cylinder head is further formed with a second inlet port which leads from the induction manifold to the second inlet valve. The second inlet valve is arranged to lift at a timing close to TDC of the exhaust stroke. The second inlet port is not provided with any flow control valves and thus provides constant communication between the induction manifold and the first inlet valve.

As will be appreciated the lift timing of the first valve is arranged to provide good respiration characteristics when the engine is operating at high engine speeds while the second appropriate characteristics when the engine is operating under low load/engine speed conditions such as idling.

However, this arrangement has suffered from the drawback that as the first inlet port is used under both middle and high engine speed operation and the second under low, middle and high engine speeds, a compromise must be struck and the length of both ports selected to provide optimum charging efficiency during middle engine speed operational modes so as to avoid any "flat spots" in engine output as the engine speed rises from low to medium engine speed. This of course reduces the effect of the system at low and high speed engine operation modes.

Japanese Patent Application First Provisional Publication Sho 57-110765 discloses an arrangement similar to that mentioned above but wherein the length and cross section of the induction passages which lead to the inlet valves are selected to provide a ramming effect which improves charging efficiency. However, like the above mentioned arrangement, in order to avoid "flat spots", the sizing of the ports is such as to be a compromise between high and low speed operation so as to obviate a loss of charging efficiency when the engine moves from low to middle engine speed operation. Accordingly, the ramming effect provided by this induction system at low engine speeds is insufficient to generate the desired degree of swirl within the combustion chamber under such conditions. This of course leads to deterioration of engine operation stability especially during idling and the like due to poor flame front propergation and thus enhances the undesirable emission of pollutants such as HC and CO.

SUMMARY OF THE INVENTION

It is an object of the present invention to provide an induction system wherein a strong swirl can be generated in the combustion chamber at low engine speeds so as to ensure smooth and stable engine idling as well as providing good ramming characteristics and thus good charging efficiency over essentially the whole range of commonly used medium to high engine speeds.

In brief, the above object is achieved by an arrangement wherein each combustion chamber of the engine is communicated with (a) first and second induction passages which are dimensioned to produce an optimal ramming effect during high speed and (b) a third passage which provides good ramming during low engine speed operation. The first and second induction passages are provided with flow control valves which can be opened simultaneously or in a step-wise manner as the engine speed moves from a low speed range into a high speed one. The third passage is arranged to merge with the first so that during idling and the like, the flow of air entering the combustion chamber produces a strong swirl and promotes good atomization of the fuel injected into the first passage by a fuel injector in the event that the engine is fuel injected.

In more specific terms, the present invention is deemed to take the form of an internal combustion engine which features: means defining a combustion chamber; first and second induction ports leading to the combustion chamber; first and second inlet valves for controlling fluid communication between the combustion chamber and the first and second induction ports respectively; an induction manifold including a collector section and a structure which defines first and second induction conduits which lead from the collector section to the first and second induction ports respectively; first and second flow control valves disposed in the first and second ports respectively, the first and second flow control valves being located upstream of the first and second inlet valves; means for causing the first and second flow control valves to close and prevent the flow fluid from the collector section to the combustion chamber during a predetermined first mode of engine operation and for opening the valves when the engine enters a second predetermined mode of engine operation; a third induction port, the third induction port being arranged to merge with the first port at an acuate angle at a location downstream of the first flow control valve; and a third conduit which leads from the collector section to the third port; the length and cross sectional area of the flow paths defined between the collector section and the combustion chamber via the first and second induction conduits and first and second induction ports being selected to induce good induction efficiency during the second mode of engine operation and the length and cross sectional area of the flow path defined between the collector section and the combustion chamber via the third conduit and third port selected to induce good induction efficiency during the first mode of engine operation.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Figure 1:
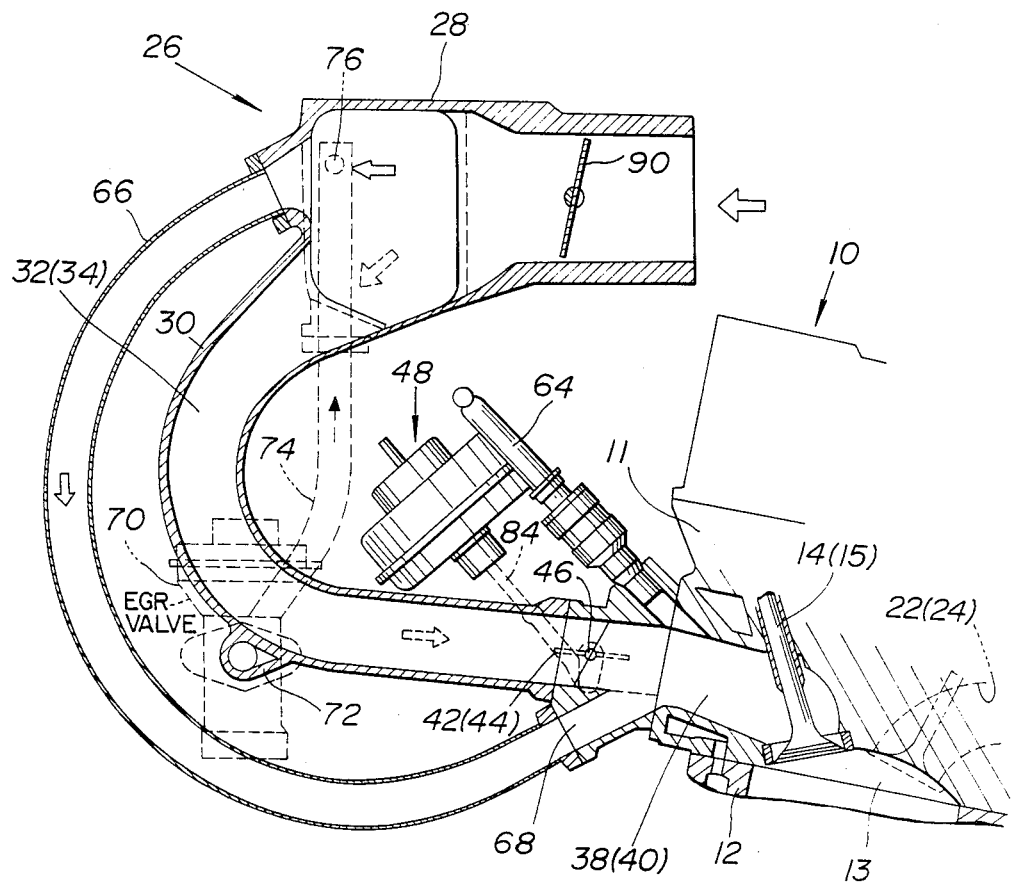
FIG. 1 is a sectional elevation of a first embodiment of the present invention.
Figure 2:
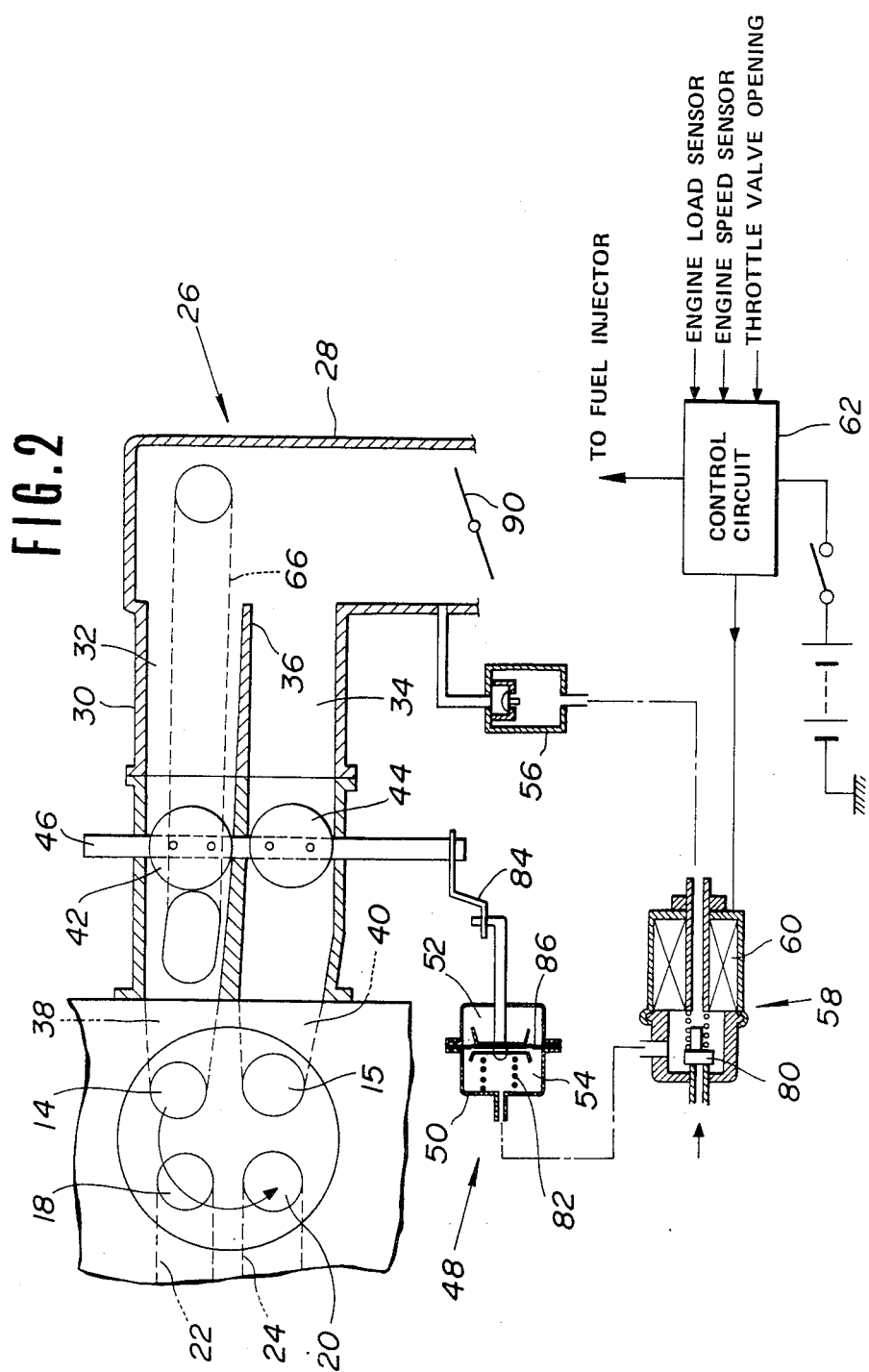
FIG. 2 is a schematic plan view of the first embodiment of the present invention showing in particular, the control arrangement which forms a vital part thereof.

A first embodiment of the present invention is shown in FIGS. 1 and 2. In this arrangement an internal combustion engine 10 includes a cylinder head 11 detachably secured to a cylinder block 12. The cylinder head is formed with a cavity which defines a combustion chamber 13. The combustion chamber 13 is communicated with an exhaust manifold (not shown) via first and second exhaust valves 18, 20 and corresponding exhaust ports 22, 24. The engine further includes an induction manifold 26 which is secured to the cylinder head 11. The manifold 26 includes a collector section 28 from which a curved bifurcate branch runner 30 (viz., a runner which includes first and second induction conduits 32, 34 which are separated by a wall or partition 36) extends to mate with first and second induction ports 38, 40 formed in the cylinder head 11. Communication between the induction ports and the combustion chamber 16 is controlled by first and second inlet valves 14, 15. The first inlet valve 14 is arranged to open with a small overlap with the exhaust valves while the second one 15 is lifted well before the end of the exhaust phase so to provide a large overlap. Flow control valves 42, 44 which, in this embodiment take the form of butterfly type valves, are disposed in the respective induction ports 38, 40. The valves 42, 44 are connected to a common shaft 46 and thus arranged to rotate synchronously under the influence of a servo device 48. In the instant embodiment the servo takes the form of a vacuum motor 50 having an atmospheric chamber 52 and a pressure chamber. The latter mentioned chamber (54) is connected with a vacuum reservoir 56 through a solenoid controlled three-way valve 58. The solenoid 60 of the valve 58 is arranged to be energized by a control circuit 62 which, in this instance, also controls the injection timing of a fuel injector 64 disposed in the first induction port 38 downstream of the flow control valve 42 (see FIG. 1).

The induction system further includes a third induction conduit 66 which leads from the collector section 28 of the induction manifold 26 to a third induction port 68 formed in the cylinder head 12. This third port 68 is arranged, as shown, to merge with floor or lower portion of the first port 38 at acute angle at a location downstream of the flow control valve 42.

The length and cross sectional area of the induction passages defined by the first and second induction ports 38, 40 and the conduits 32, 34 defined within the bifurcate runner 30 are selected so that slugs of air passing therethrough from the collector section 28 have a mass and velocity (viz., an inertia) which induces an optimum ramming effect under high speed modes of engine operation (5000 to 6000 RPM by way of example). On the other hand, the length and cross sectional area of the induction passage defined by the third induction conduit 66, the third port 68 and the portion of the first induction port 38 downstream of the third port 68, are selected to induce the maximum ramming effect at low engine speeds (e.g. idling).

An EGR control valve 70 which controls the amount of exhuast gases recirculated from the exhaust system to the induction manifold 26 is mounted on a boss 72 formed on the bifurcate branch runner 30. A delivery tube 74 extends from the valve 70 and extends into the collector section 28 of the induction manifold 26. A discharge port 76 of the delivery tube 74 is arranged essentially adjacent the inlet of the third induction conduit 66.

In operation, when the engine is idling or otherwise operating under light load/speed conditions the control circuit 62 conditions the solenoid valve 58 in a manner to assume an energized or ON state and thus cause the valve element 80 thereof to assume a position wherein atmospheric pressure is delivered to the pressure chamber 54 of the vacuum motor 50. Under these conditions a spring 82 disposed in the pressure chamber 54 biases a linkage arrangement 84 connected to a diaphragm 86 which hermetically partitions the pressure and atmospheric chambers 54, 52 of the vacuum motor 50, in a manner to rotate the flow control valves 42, 44 to a fully closed position.

Under these circumstances, air is inducted into the combustion chamber 16 via only the third induction conduit 66. Due to the relative small diameter of the conduit, the air flowing therethrough is accelerated to a relatively high velocity and as such tends to adhere to the floor of the first induction port 38 upon entry thereinto. This phenomenon (coanda effect) advantageously causes the air flowing into the combustion chamber 13 to enter same at an angle and velocity highly suited to the formation of a strong swirl (about the axis of the cylinder bore) which will persist well into the compression phase of the engine. Further, the fuel injected into the first port by the fuel injector 64 tends to be entrained in the rapidly moving air flow and undergo good atomization.

Accordingly, due to the good atomization of the fuel and the strong swirl produced under the instant set of conditions stable combustion (which minimizes engine vibration) and low emissions of HC and CO is assured.

Upon the engine throttle valve 90 being opened and the engine speed increasing to a predetermined level, the control circuit 62 de-energizes solenoid 60 to condition the valve 58 to provide fluid communication between the vacuum reservoir 56 and the pressure chamber 54 of the vacuum motor 50. This induces the situation wherein the diaphragm 86 moves back against the bias of the spring 82 thus pulling the linkage arrangement 84 in a manner which rotates the butterfly valves 42, 44 toward their fully open position. This allows air to flow through the bifurcate runner 30 and flow into the combustion chambers via the first and second induction ports 38, 40. It will be noted that as the air flowing through the second port 40 is not mixed with fuel before entering the combustion chamber 13, this flow of air not only collides with the flow which is introduced via the first port 38 in a manner which damps excessive swirl rates which would otherwise tend to occur under such conditions, but further increases the atomization and mixing of the air fuel mixture entering the combustion chamber 13 from the first induction port 38. This phenomenon promotes good combustion characteristics which in combination with the efficient ramming which takes place at this time induces a notable improvement in engine performance.

Figure 3:
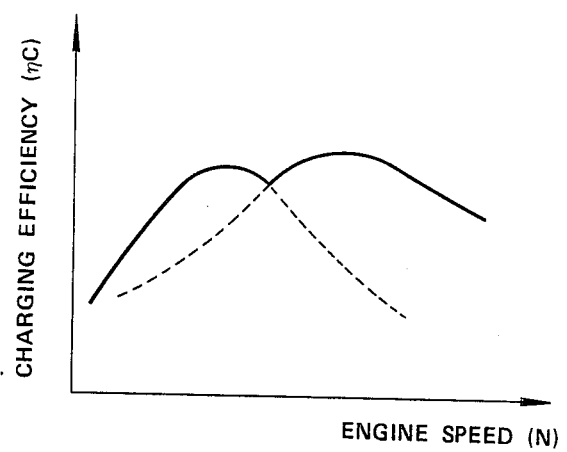
FIG. 3 is a graph showing in terms of charging efficiency and engine speed, the charging characteristics provided by the first embodiment of the present invention.

FIG. 3 shows, in terms of charging efficiency (nC) and engine rotational speed (RPM), the induction characteristics provided by the first embodiment of the present invention. As will be appreciated, during low engine speeds the charging efficiency rises rapidly. As the RPM increases into the middle speed range, just as the effect of the third induction passage begins to diminish, the effect of the opening of the first and second passages maintain the charging efficiency at a high level until the engine RPM enters well into the high speed range.

Thus, as will be appreciated the first embodiment of the present invention features good charging efficiency over essentially the whole range of commonly used engine speeds and as well as providing good swirl and fuel atomization at idling and the like low speed operation.

Figure 4:
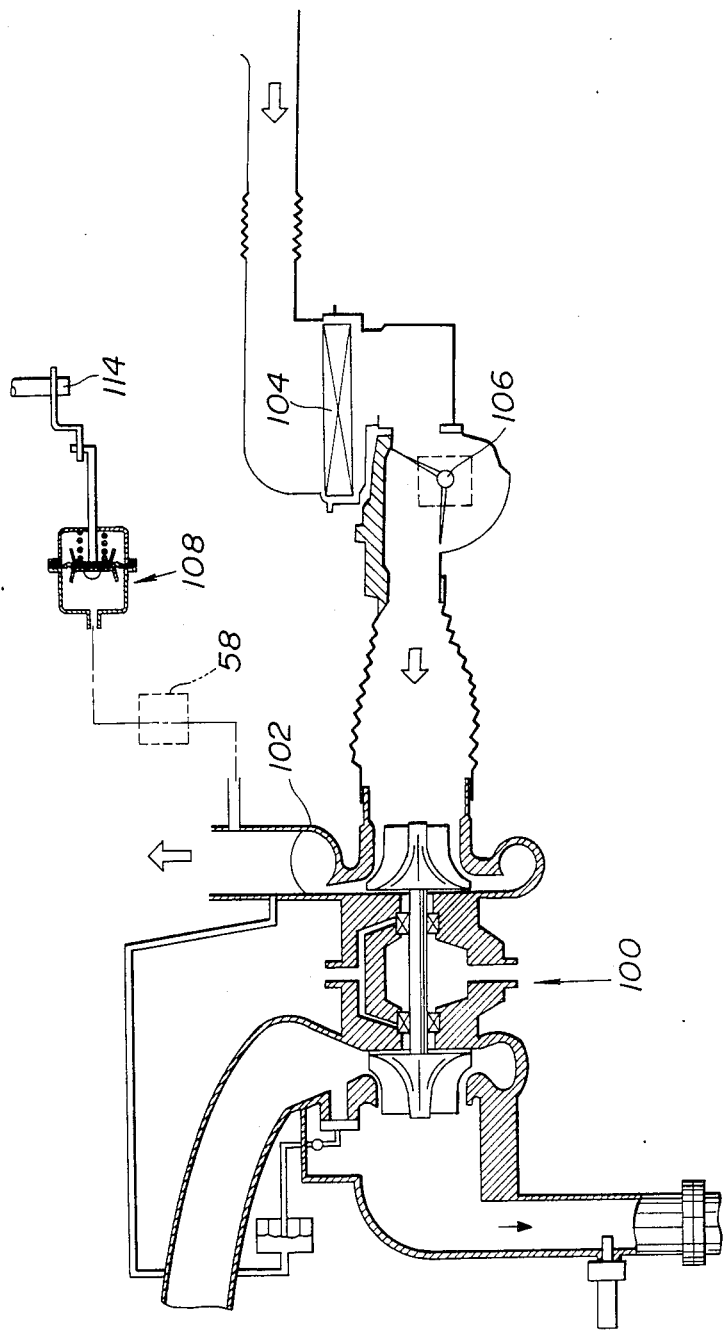
FIG. 4 is a sectional elevation of a turbocharger which is associated with a second embodiment of the present invention.
Figure 5:
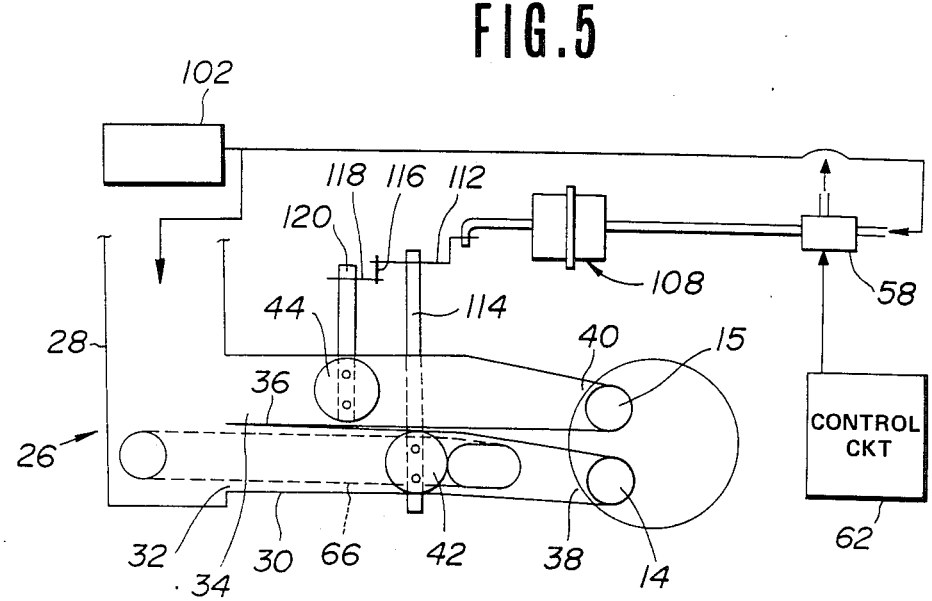
FIG. 5 is a schematic plan view of the second embodiment of the present invention.
Figure 6:
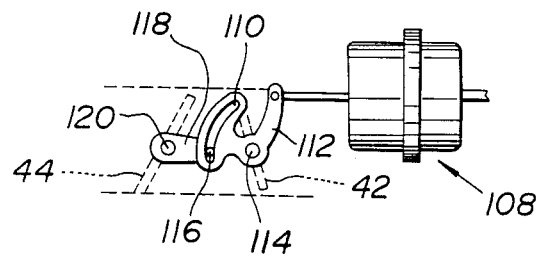
FIG. 6 shows part of the valve operating linkage which is used in the arrangement shown in FIG. 5.

FIGS. 4 to 6 show a second embodiment of the present invention. This embodiment differs from the first one in that the induction system includes a turbocharger 100 (viz., a supercharger driven by the exhaust gases discharged from the combustion chamber of chambers of the engine). As shown, the compressor 102 of the turbocharger is arranged to inducted air via an air filter 104 and air flow meter 106. The output of the air flow meter 106 can be fed to the control circuit 62 and used to indicate the momentary load on the engine.

In this embodiment the vacuum motor of the first embodiment is replaced with a positive pressure unit 108 which is operated on tapped off from the compressor 102 of the turbocharger 100 and arranged so that as the pressure delivered to the pressure chamber thereof (no numeral) increases the degree by which the flow control valves 42, 44 are opened is varied.

This embodiment further differs in that the first and second flow control valves 42, 44 are disposed on separate shafts and are arranged to be opened in a stepwise manner. Moreover, the control unit 62 is arranged to vary the duty cycle of the signal used to energize the solenoid control valve 58 in response to the changes in engine speed and/or other operational parameters if so desired, in a manner which allows the valves to be either continuously opened or opened in a number of stages as compared with the first embodiment wherein they are moved directly from closed to open and vice versa.

FIG. 6 shows part of the linkage arrangement which enables the first flow control valve 42 to open either partially or wholly before the second one 44 is cracked from its fully closed position. As will be appreciated, this arrangement includes a lost motion connection defined by a curved slot 110 formed in a control lever 112 attached to the shaft 114 of the first control valve 42 and a pin 116 provided on a corresponding bracket 118 connected to the shaft 120 on which valve 44 is mounted.

In operation, as the pressure delivered to the pressure motor 108 increases, the linkage arrangement interconnecting the motor 108 and the lever 112 drives the first flow control valve 42 from its closed position toward a fully open one. Upon the lever 112 rotating to a position wherein the pin 116 engages the end of the slot 110, the second flow control valve 44 undergoes an initial opening. In order to allow the first flow control valve 42 to remain in its fully open position when the second one 44 is being moved from its closed position towards its fully open one, the first valve 42 is biased by a coil spring or like device (not shown) so as to move synchronously with the shaft 114 on which it is mounted until it reaches is fully open position. A suitable stop is provided (not shown) to prevent excessive rotation of the valve member while the shaft 114 continues to be rotated under the influence of the pressure motor 108 and the linkage arrangement.

Figure 7:
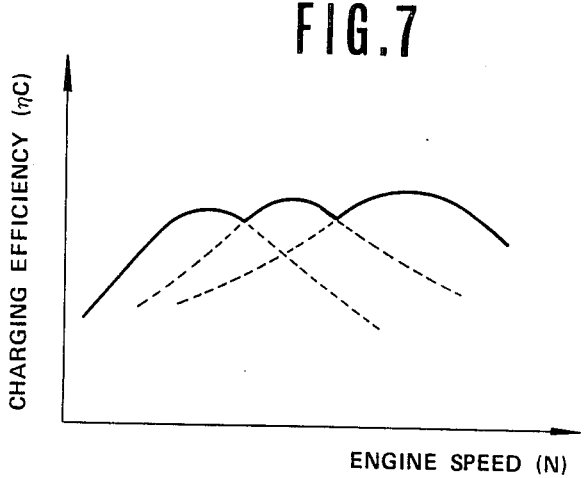
FIG. 7 is a graph similar to that shown in FIG. 3 which shows the charging characteristics provided by the second embodiment of the present invention.

FIG. 7 shows, in graphical form, an example of the charging characteristics obtained with the second embodiment. As will be appreciated, the charging efficiency increases rapidly during low engine speed operation due to the provision of the third induction conduit 66. Subsequently, as the efficiency of this arrangement peaks the opening of the first flow control valve 42 maintains the level of charging efficiency at a high level until the second control valve 44 is opened and subsequently maintains the high level of efficiency as the ramming effect of the first induction passage peaks and begins to diminish.

With the embodiments of the present invention it is possible to not only open the first inlet 14 valve later than the second 15 one so as exhibit a small overlap with the exhaust valves 18, 20 but close same earlier than the second inlet valve 15. Further, in order to tailor the induction system to the needs of various types and/or sizes of engine, it is possible to vary the ramming characteristics of the system by simply varying the length of the partition or wall 36 which devides the first and second conduits 32, 34 formed in the bifurcate runner 30.

It will be noted that it is also within the scope of the present invention to operate the inlet valves of the above described embodiments so that they open and close with essentially the same timing and that the present invention is not necessarily limited to an arrangement wherein one valve is opened with a large overlap with respect to the lift timing of the exhaust valves while the other opens essentially at TDC of the exhaust stroke.

What is claimed is:

1. In an internal combustion engine
   means defining a combustion chamber;
   first and second induction ports leading to said combustion chamber;
   first and second inlet valves for controlling fluid communication between said combustion chamber and said first and second induction ports respectively;
   an induction manifold including a collector section and a structure which defines first and second induction conduits which lead from said collector section to said first and second induction ports respectively;
   first and second flow control valves disposed in said first and second conduits respectively, said first and second flow control valves being located upstream of said first and second inlet valves;

a third flow control valve upstream of said collector, said third valve controlling the amount of air which enters said collector;

a device for causing said first and second flow control valves to close independently of said third flow control valve and prevent the flow of fluid from said collector section to said combustion chamber during a predetermined first mode of engine operation and for opening said valves when said engine enters a second predetermined mode of engine operation;

a third induction port, said third induction port being arranged to merge with said first port at an acute angle at a location downstream of said first flow control valve; and a single third conduit which leads from said collector section to said third port; said first, second, and third conduits constituting the entire flow path from said collector section to said induction ports;

the length and cross sectional area of the flow paths defined between said collector section and said combustion chamber via said first and second induction conduits and first and second induction ports being selected to induce good induction efficiency during said second mode of engine operation and the length and cross sectional area of the flow path defined between said collector section and said combustion chamber via said third conduit and third port selected to induce good induction efficiency during said first mode of engine operation.

2. An engine as claimed in claim 1, further comprising an EGR valve for controlling the recirculation of exhaust gases exhaust from said combustion chamber to said induction manifold, said EGR valve including a delivery tube which extends into said collector section, said delivery tube being provided with a delivery port which is located in close proximity of the upstream end of said third conduit.

3. An internal combustion engine as claimed in claim 1, further comprising a fuel injector which is arranged to inject fuel into said first port downstream of said first flow control valve.

4. An internal combustion engine as claimed in claim 1, wherein said first and second flow control valve closing device takes the form of:
a fluid pressure operated motor;
a linkage interconnecting said motor and said first and second flow control valves;
a source of pressure;
a valve for controlling fluid communication between said source of pressure and said motor; and
a control circuit responsive to engine operational parameters of said engine which controls said valve to selectively control the pressure fed to said motor from said source.

5. An internal combustion engine as claimed in claim 1, wherein said third port is arranged with respect to said first port so that when said first and second flow control valves are closed the air passing through said third port enters said first port and subsequently flows into said combustion chamber in manner which promotes a strong swirl within same.

6. An engine as claimed in claim 3, wherein said fuel injector is arranged to inject fuel toward the path followed by the air which flows out of said third port when said first and second flow control valves are closed.

7. An internal combustion engine as claimed in claim 4, wherein said linkage is arranged to open said first control valve to a predetermined degree before said second valve is moved from a fully closed position.

8. An internal combustion engine as claimed in claim 1, wherein said first valve being arranged to open near the end of the exhaust phase of the engine while the second valve is arranged to open at a predetermined timing prior the end of said exhaust phase.

9. An internal combustion engine as claimed in claim 1, wherein said device is arranged to synchronously open and close said first and second control valves.

* * * * *